Oct. 13, 1953  A. BECHLER  2,655,067
GUARD DEVICE FOR MACHINE TOOLS
Filed Dec. 17, 1948

INVENTOR:
ANDRÉ BECHLER
BY K.A. Mayr
ATTORNEY.

Oct. 13, 1953  A. BECHLER  2,655,067
GUARD DEVICE FOR MACHINE TOOLS
Filed Dec. 17, 1948  2 Sheets-Sheet 2
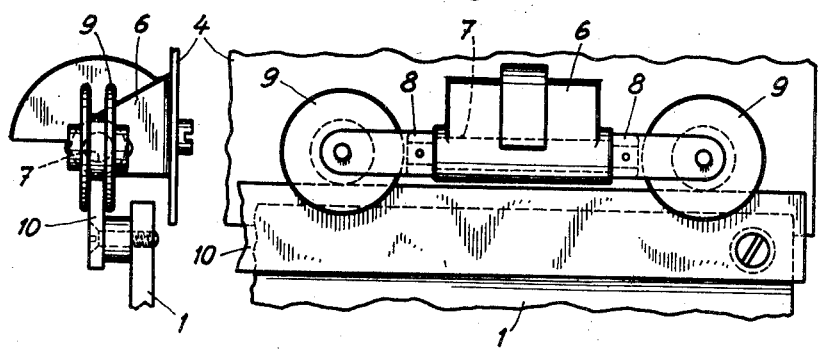
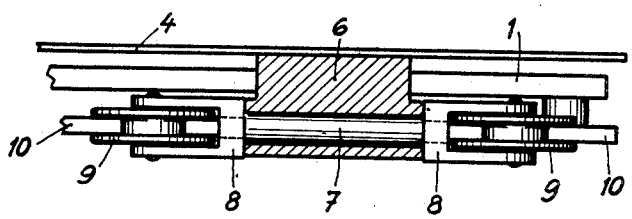
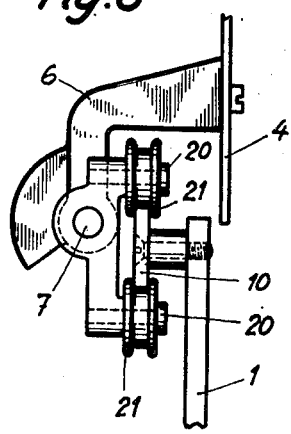
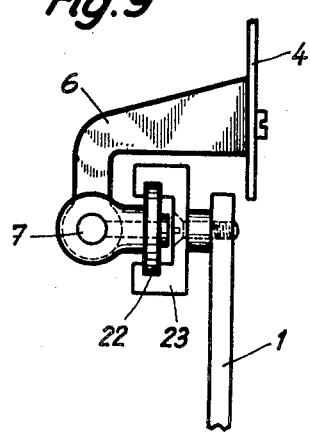
INVENTOR:
ANDRÉ BECHLER
BY K. A. Mayr
ATTORNEY Patented Oct. 13, 1953

2,655,067

UNITED STATES PATENT OFFICE 2,655,067

GUARD DEVICE FOR MACHINE TOOLS

André Bechler, Moutier, Switzerland

Application December 17, 1948, Serial No. 65,912
In Switzerland December 24, 1947

5 Claims. (Cl. 82—34)

1

This invention relates to an industrial safety shield, for example, for automatic lathes, and more particularly to a device comprising a shield element adapted to be moved on rails. Conventional devices of this character must be removed as a whole and set down beside the machine in connection with which they are used for making certain parts of the latter accessible to permit setting up or starting the machine. This necessitates space for setting down the shield and is troublesome, skill being required to place the rollers of the protecting device back onto the runways provided on the opposite sides of the machine tool.

It is the principal object of my invention to provide a protecting device of the aforementioned kind, which avoids the above cited disadvantages. To this end, I make the protecting cover or shield pivotable around an axis parallel to the longitudinal axis of the shield and disposed close to one of the runways.

Another object of my invention is to locate the pivot axis at a level higher than the roller at the other side of the shield in order to permit the protecting cover to be swung back freely.

Other objects of this invention will appear hereinafter as the description proceeds, the novel feature, combinations and construction being more particularly pointed out in the specification and the claims hereunto appended.

The accompanying drawings represent, by way of example, one embodiment of the device according to the invention and two modifications of a detail of this embodiment.

Figure 1:
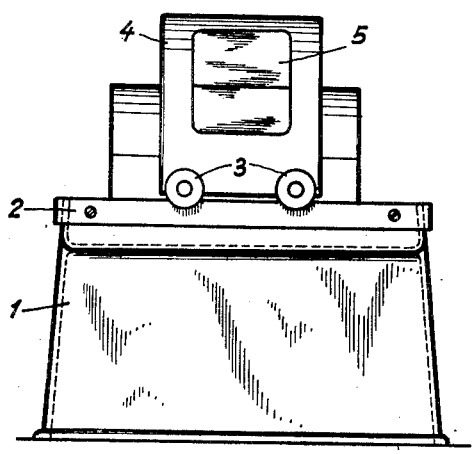
Figure 2:
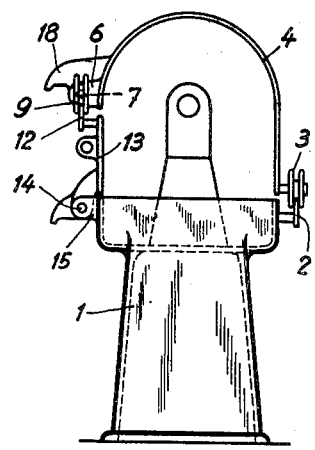
Figure 3:
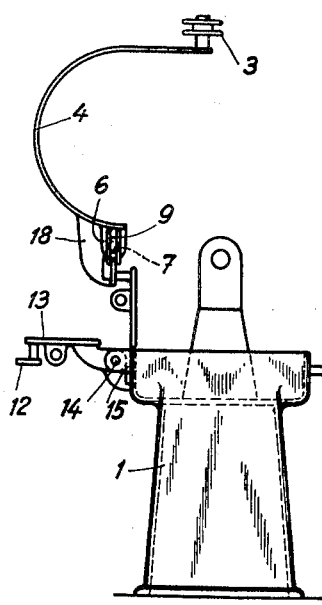
Figure 4:
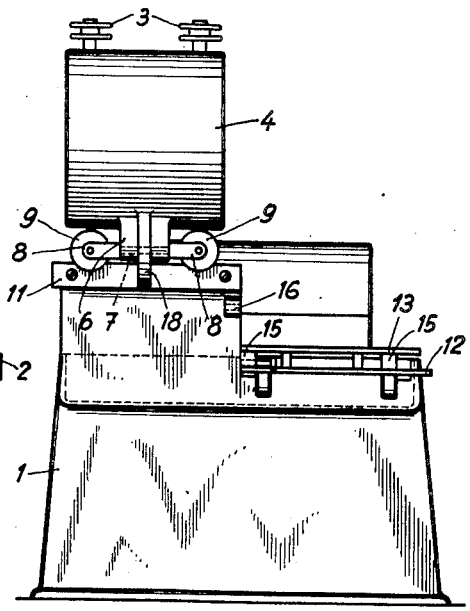

Fig. 1 is an elevation of the device in combination with a machine tool,

Fig. 2 is a side elevation, with the protecting cover in its operative swung down position, Fig. 3 is a similar view, with said cover in its swung-back position, Fig. 4 is an elevational back view of the machine tool, the protecting cover occupying the same position as in Fig. 3, Fig. 5 is a detail view, on a larger scale, of the connection of the cover with one of its runways, Fig. 6 shows the detail illustrated in Fig. 5 in side elevation, and Fig. 7 in plan view, a portion being broken away, Figs. 8 and 9 show two different modifications of detail illustrated in Figs. 5 to 7, in veiws similar to Fig. 5.

Referring now to the embodiment represented in Figs. 1 to 7, inclusive, the bed of the automatic lathe is designated by 1. This bed is fitted

2 on the front side with a rail 2 constituting a runway for grooved rollers 3 rotatably mounted on pivots fixed to a protecting shield element 4 adapted to cover the upper part of a portion of the machine tool and having a window 5 through which the working parts of the machine may be observed. On the side of element 4 opposite to that provided with the rollers 3, a support 6 (see also Figs. 6 and 7) which forms a carriage which is secured to the element, the support being pivotably mounted on a shaft member 7. Each end of shaft member 7 is provided with a forked part to which a pivot for a grooved roller 9 is secured.

The groove of the rollers 9 is very deep so that the rollers have flanges for straddling rail 10 to form a transverse fixed support for the carriage. Rail 10 extends over the whole length of the lathe and has two sections, section 11 being fixed, while section 12 is secured to an arm 13 rotatably mounted on an axle 14 carried by lugs 15 of the machine frame. The arm 13 and the rail 12 as a whole may be locked to said frame by means of a bolt slidable in a bore of a lug 16 of said frame, by urging said bolt through a bore of a similar lug provided on the arm 13, said bores being in alignment when the arm 13 is in the position shown in Fig. 2. In this position, the sections 11 and 12 of the rail 10 are in alignment, and the runway constituted by this rail is uninterrupted.

Whether the protecting cover is carried by the one or the other section of the rail 10, it may be swung back around the axle 7, i. e., put into the position shown in Figs. 3 and 4, in order to give access to the working parts of the machine tool. In this swung back position of the cover 4, an abutment 18 integral with the cover bears against the rail 10 and thereby limits the backwards swinging movement of the cover.

With the cover positioned over the rail section 11, the arm 13 and the rail section 12 may be swung backwards after having been unlocked from the machine frame, in order to bring them into the position shown in Figs. 3 and 4, in which certain parts of the machine are accessible, access to which is normally prevented by rail 12 and arm 13.

It should be noticed that, as the swinging axle 7 is located very close to the rail or runway 10 and as this runway is located at a level substantially higher than that of the rail 2 the front of the cover 4, i. e. the portion carrying the rollers 3, is free to be moved along an arc clearing all parts of the lathe. The groove of the roller 9 is of such a depth and the rims of the roller are so designed that they hug the rail 10, so that there is no danger of the roller being derailed.

Fig. 8 shows a modified connection of the cover 4 with the rail. The axle 7 carries on each of its ends a part provided with two pivots 20 of a pair of rollers 21 disposed at each side of the rail 10. This arrangement prevents a derailment when the cover 4 is swung back.

The arrangement shown in Fig. 9 answers the same purpose as the one shown in Fig. 8. Here, the parts secured to each end of the axle 7 are fitted with a single pivot for one roller 22 adapted to run in a rail 23 having a U-shaped cross-section and longitudinal channels in which the rollers 22 are guided.

While I have described and illustrated one embodiment of my invention and two detail modifications thereof, I do not wish to unnecessarily limit the scope of this invention but reserve the right to make such modifications and rearrangements of the several parts as may come in the purview of the accompanying claims.

What I claim is:

1. An industrial safety shield comprising a shield element having two longitudinal parallel marginal side portions, rollers mounted on one of said side portions adapted to roll on a support rail, a bracket means fixed to the other of said side portions, a shaft member extending rotatably through said bracket means in parallel relation to said side portions, and rollers rotatably mounted on said shaft member and adapted to roll on a second support rail, the axes of rotation of said last mentioned rollers being at a right angle to said shaft member.

2. An industrial safety shield comprising a shield element having two longitudinal parallel marginal side portions, rollers mounted on one of said side portions adapted to roll on a support rail, carriage means longitudinally pivotally connected with the other of said side portions and comprising rollers, adapted to roll on a second support rail, said last mentioned rollers having flanges for straddling the second support rail to form a transverse fixed support for said carriage means.

3. An industrial safety shield comprising a shield element having two longitudinal parallel marginal side portions, rollers mounted on one of said side portions adapted to roll on a support rail, and carriage means pivotally connected with the other of said side portions, the pivot axis being parallel to said side portions, said carriage means comprising rollers adapted to roll on a second support rail, the side portion with which said carriage means are connected being at a higher elevation than the other side portion.

4. A safety shield device for a machine tool comprising, in combination, two parallel support rails, a shield element having two longitudinal parallel marginal side portions, rollers mounted on one of said side portions and adapted to run on one of said support rails, and carriage means longitudinally pivotally connected with the other of said side portions and comprising rollers adapted to roll on the other of said rails, the side portion with which said carriage means are connected being at a different elevation than the other side portion, the support rail for said carriage means comprising two sections, one of said sections being stationary, the other section being movable relative to said stationary section when the carriage means is on the stationary section.

5. An industrial safety shield comprising a shield element having a portion curved about the longitudinal axis of the shield, said element having two marginal side portions extending parallel to the longitudinal axis of the shield, rollers mounted on one of said side portions adapted to roll on a support rail, carriage means comprising rollers adapted to roll on a second support rail, and a pivotal connection between said carriage means and the other of said side portions, the pivot axis of said connection being parallel to the longitudinal axis of the shield.

ANDRÉ BECHLER.

References Cited in the file of this patent

UNITED STATES PATENTS

| Number | Name | Date |
| --- | --- | --- |
| 461,102 | Gerber | Oct. 13, 1891 |
| 1,421,039 | Sweningston | June 27, 1922 |
| 1,447,895 | Schafer | Mar. 6, 1923 |
| 1,689,719 | Drake | Oct. 30, 1928 |
| 2,183,051 | Stuprich | Dec. 12, 1939 |
| 2,220,425 | Potter | Nov. 5, 1940 |
| 2,227,407 | Curtis | Dec. 31, 1940 |
| 2,232,844 | Eckardt et al. | Feb. 25, 1941 |
| 2,353,590 | Schutz | July 11, 1944 |
| 2,401,056 | Dilley | May 28, 1946 |
| 2,491,957 | Dilley | Dec. 20, 1949 |

FOREIGN PATENTS

| Number | Country | Date |
| --- | --- | --- |
| 422,763 | Great Britain | Jan. 17, 1935 |